(No Model.)
J. B. DUNLOP.
WHEEL TIRE FOR CYCLES.
No. 435,995.  Patented Sept. 9, 1890.
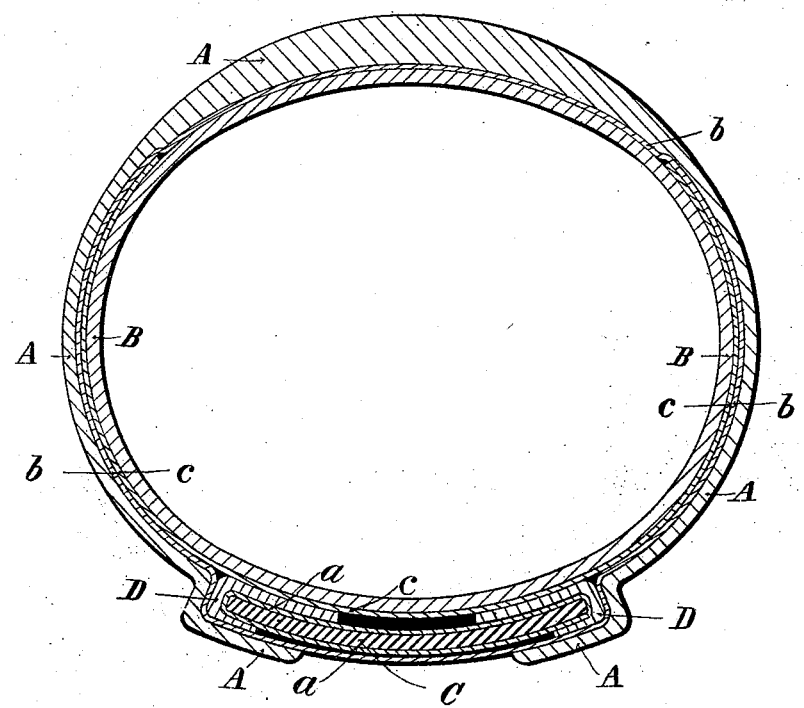
Witnesses.
Benjamin King
Charles Ennis
Inventor.
John Boyd Dunlop
per James Stevenson
Attorney.

United States Patent Office.

JOHN BOYD DUNLOP, OF BELFAST, IRELAND.

WHEEL-TIRE FOR CYCLES.

SPECIFICATION forming part of Letters Patent No. 435,995, dated September 9, 1890.

Application filed March 11, 1890. Serial No. 343,445. (No model.) Patented in England March 8, 1889, No. 4,116.

*To all whom it may concern:*

Be it known that I, JOHN BOYD DUNLOP, of 50 Gloucester Street, Belfast, Ireland, a subject of the Queen of Great Britain, have invented certain new and useful Improvements in Wheel-Tires for Cycles and other Vehicles, and in means for securing the same to the wheel-rims, (for which I have obtained a patent in Great Britain, No. 4,116, bearing date March 8, 1889,) of which the following is a specification.

My invention has for its object to provide a hollow or tubular india-rubber tire for the wheels of cycles and other vehicles which is inflated with air or gas under pressure and surrounded with cloth, canvas, or other suitable material to adapt it to withstand the internal pressure of the within-contained air or gas and to allow of its being maintained securely in position on the rim of the cycle or vehicle wheel.

In order that my invention may be the better understood, I have appended the accompanying drawing, the figure there shown illustrating a cross-section, on enlarged scale, of the tire constructed according to my invention.

In carrying out my invention I employ an external covering A, composed of a layer or fold of india-rubber, which is thickened at that portion which comes in contact with the ground. An inner expansible tube B, also of india-rubber, contains the air or gas under pressure.

C is the metallic rim of the wheel, which is somewhat flattened to obtain a large bearing-surface, and enveloped with a protective strip $a$, of canvas, cloth, linen, or the like. Strips D, of caoutchouc or other elastic substance, are interposed between the edges of the rim C and the folds or layers $b$ $c$, of canvas or linen, hereinafter more particularly referred to, so as to protect the latter from being cut by the edges of said rim C. A strengthening fold or layer $b$ of cloth, linen, or canvas, which is cemented or otherwise affixed to the inner surface of the external covering A, envelops the inner tube B and the rim C, to which latter it is cemented or otherwise securely fastened, so as to retain the tire thereon in an efficient manner, a strengthening fold or layer $c$, of linen or canvas, being attached to the inner surface of the before-mentioned layer $b$ and cemented to the linen or canvas layer $a$, encircling the metallic rim C. At any suitable point on the rim of the wheel I provide a non-return valve, which is inserted through an aperture formed for the purpose in the metallic rim C, and protrudes within the inner expansible tube B. The enveloping folds or layers of canvas $b$ $c$ effectually resist any undue pressure that may be exerted by the contained air or gas at any particular point, and thus prevent deformation of the tire. The said folds or layers, moreover, serve to effectually maintain the tire in the desired position on the metallic rim C of the wheel.

From the foregoing description it will be obvious that a hollow air-inflated india-rubber tire constructed according to my invention possesses several important advantages over the solid india-rubber tires at present in use, inasmuch as, while being equal in strength to those ordinarily made, it is more elastic, all vibration and shock when riding or driving over rough roads being intercepted between the rim of the wheel and the ground. Consequently little or no jar is experienced by the rider or riders of the cycle or occupants of the vehicle to which my improvements are applied.

Having now particularly described and ascertained the nature of my said invention and in what manner the same is to be performed, I declare that what I claim is—

In hollow air-inflated wheel-tires for cycles and other vehicles, the combination, with an inner expansible tube B and outer protective covering A, of strengthening folds or layers $b$ $c$ of cloth, canvas, or linen, and protective strips D of caoutchouc interposed between the edges of the rim C and strengthening fold or layer $b$, substantially as and for the purposes herein set forth.

In testimony that I claim the foregoing as my invention I affix my signature in presence of two witnesses.

JOHN BOYD DUNLOP. [L. S.]

Witnesses:
 HARPER CRAWFORD,
 ALEXANDER ADAIR.

*Notary's Assistants, 10 Arthur Street, Belfast, Ireland.—*